(12) United States Patent
Watanabe et al.

(10) Patent No.: US 7,542,232 B2
(45) Date of Patent: Jun. 2, 2009

(54) MOTOR UNIT INCLUDING SPINDLE MOTOR AND RECORDING-DISK-DRIVING DEVICE INCLUDING THE SAME

(75) Inventors: Tsuchitsugu Watanabe, Kyoto (JP); Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 484 days.

(21) Appl. No.: 11/420,013

(22) Filed: May 24, 2006

(65) Prior Publication Data

US 2006/0268453 A1 Nov. 30, 2006

(30) Foreign Application Priority Data

May 24, 2005 (JP) ............................. 2005-150413
May 23, 2006 (JP) ............................. 2006-142288

(51) Int. Cl.
*G11B 17/02* (2006.01)
(52) U.S. Cl. .................................................. 360/99.08
(58) Field of Classification Search ............. 360/98.07, 360/99.04, 99.08, 99.11, 97.02; 310/90.5, 310/91, 156.45; 347/243
See application file for complete search history.

(56) References Cited

U.S. PATENT DOCUMENTS

| | | | | |
|---|---|---|---|---|
| 5,367,416 A * | 11/1994 | Cossette et al. | ........... | 360/97.02 |
| 6,097,121 A * | 8/2000 | Oku | ............................. | 310/91 |
| 6,512,654 B2 | 1/2003 | Teshima | | |
| 6,636,378 B2 | 10/2003 | Tokunaga et al. | | |
| 6,664,686 B2 * | 12/2003 | Ichiyama | .................... | 310/90.5 |
| 6,778,203 B2 * | 8/2004 | Itami et al. | .................... | 347/243 |
| 6,903,898 B2 | 6/2005 | Nonaka et al. | | |
| 6,980,394 B2 * | 12/2005 | Inoue et al. | ............... | 360/99.08 |
| 7,081,288 B2 | 7/2006 | Guo et al. | | |
| 7,105,970 B2 * | 9/2006 | Yajima et al. | ........... | 310/156.45 |
| 2001/0018123 A1 | 8/2001 | Furumori et al. | | |
| 2004/0179294 A1 * | 9/2004 | Asada et al. | .............. | 360/99.08 |
| 2005/0264121 A1 * | 12/2005 | Yajima et al. | ........... | 310/156.45 |
| 2005/0286167 A1 | 12/2005 | Yonei et al. | | |
| 2007/0065620 A1 | 3/2007 | Nonaka et al. | | |

FOREIGN PATENT DOCUMENTS

| | | |
|---|---|---|
| JP | 59-197476 | 11/1984 |
| JP | H07-073658 A | 3/1995 |
| JP | H08-245932 A | 9/1996 |
| JP | H11-053826 A | 2/1999 |
| JP | H11-167765 A | 6/1999 |
| JP | 2001-210986 A | 8/2001 |
| JP | 2001-217587 A | 8/2001 |
| JP | 2001-291215 | 10/2001 |
| JP | 2002-101611 A | 4/2002 |
| JP | 2003-308016 A | 10/2003 |
| JP | 2004-071070 A | 3/2004 |
| JP | 2004-117700 | 4/2004 |

* cited by examiner

*Primary Examiner*—Tianjie Chen
(74) *Attorney, Agent, or Firm*—Volentine & Whitt, PLLC (57) ABSTRACT

A spindle motor includes an electroconductive sheet member. The electroconductive sheet member is attached so as to be abutted against a sleeve housing and a metal exposed portion of a base plate. With the configuration, the conductivity between the base plate and the sleeve housing is preferably achieved.

19 Claims, 7 Drawing Sheets

MOTOR UNIT INCLUDING SPINDLE MOTOR AND RECORDING-DISK-DRIVING DEVICE INCLUDING THE SAME

BACKGROUND OF THE INVENTION

1. Technical Field

The present invention generally relates to a motor unit including a spindle motor and a recording-disk-driving device including the same, and in particular relates to a spindle motor in which the electric conductivity needs to be secured between components of the spindle motor.

2. Description of the Related Art

Electrostatic discharge (ESD), in which static electricity damages a magnetic head of a recording-disk-driving device, is one of the main causes of the crashes of recording-disk-driving devices such as hard disk drives (HDDs). For example, the static electricity is charged to the HDD by the friction between the spindle motor and the recording disk on assembling the HDD or by the friction between the air and the recording disk during the rotation thereof. When the static electricity is discharged to the magnetic head, which is sensitive to static electricity, the magnetic head is damaged. In order to prevent ESD, an electroconductive adhesive may be applied between the components so that each component is conductive with the housing of the HDD. With such configuration, the static electricity is not charged to HDD.

However, it is necessary to put the spindle motor assembled with the electroconductive adhesive in the thermostatic chamber held 60 to 90° C. for predetermined time to harden the adhesive. It requires a lot of time for hardening the adhesive and investments on equipments to manufacture such spindle motors.

BRIEF SUMMARY OF THE INVENTION

A motor unit according to a preferred embodiment of the present invention includes a base portion having a through hole and defining a sealed inside space, a fluid dynamic bearing mechanism arranged in the through hole, and a rotor supported by the fluid dynamic bearing mechanism.

An electroconductive sheet member is attached so as to abut both of the base portion and the fluid dynamic bearing mechanism.

The electroconductive sheet member includes the electroconductive layer electronically connecting the base portion and the fluid dynamic bearing mechanism by abutting thereto, and the substrate attached to one side of the electroconductive layer, other side of which abuts the base portion and the fluid dynamic bearing mechanism.

A motor unit according to another preferred embodiment of the present invention includes a base portion having a through hole and defining a sealed inside space, a fluid dynamic bearing mechanism arranged in the through hole, and a rotor supported by the fluid dynamic bearing mechanism, including a rotor magnet which has magnetic poles circularly arrayed and a placing portion to which a recording disk is placed at an outer peripheral portion thereof.

The motor unit also includes a stator facing the rotor magnet with a radial gap maintained therebetween, including a plurality of teeth radially arranged with tip ends thereof being directed to a center axis, a coreback connecting a plurality of the teeth, and a coil wound around each of a plurality of the teeth. In addition, the motor unit includes a magnetic shield made of a soft magnetic material and arranged between the placing portion and the coil in the axial direction.

An electroconductive sheet member is attached so as to electronically connect the base portion and the magnetic shield by abutting thereto.

The electroconductive sheet member includes at least an electroconductive layer electronically connecting the base portion and the magnetic shield by abutting thereto, and a substrate attached to one side of the electroconductive layer, other side of which abuts the base portion and the magnetic shield.

By virtue of the unique configuration described above, the conductivity between these two members may be preferably attained.

By virtue of the unique configuration described above, the conductivity between these two members may be preferably attained without a big investment on equipments and time consuming processes.

It should be understood that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated.

DETAILED DESCRIPTION OF THE INVENTION

Figure 1:
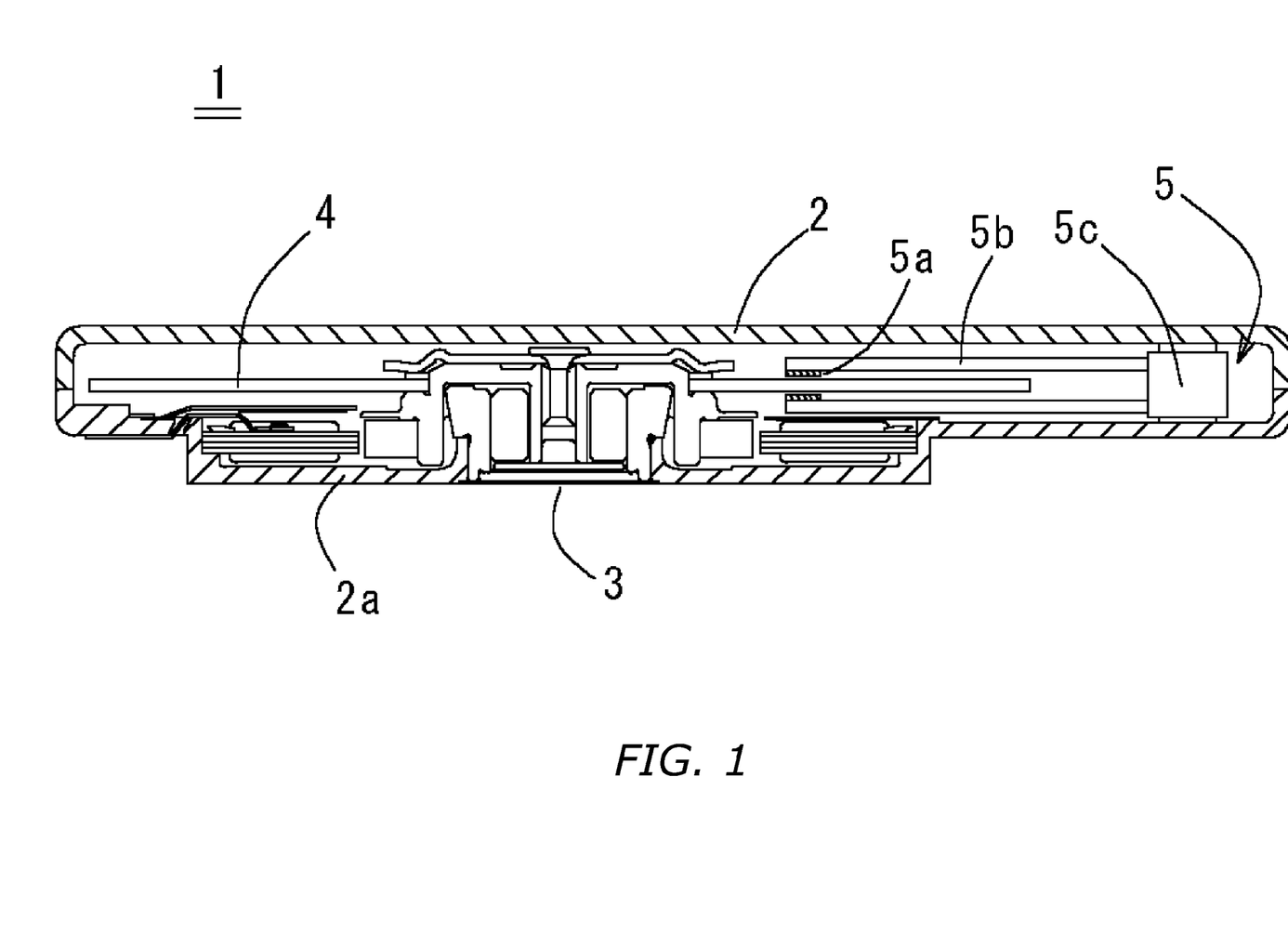
FIG. 1 is a longitudinal sectional view showing a recording-disk-driving device according to a first preferred embodiment of the present invention.
Figure 2:
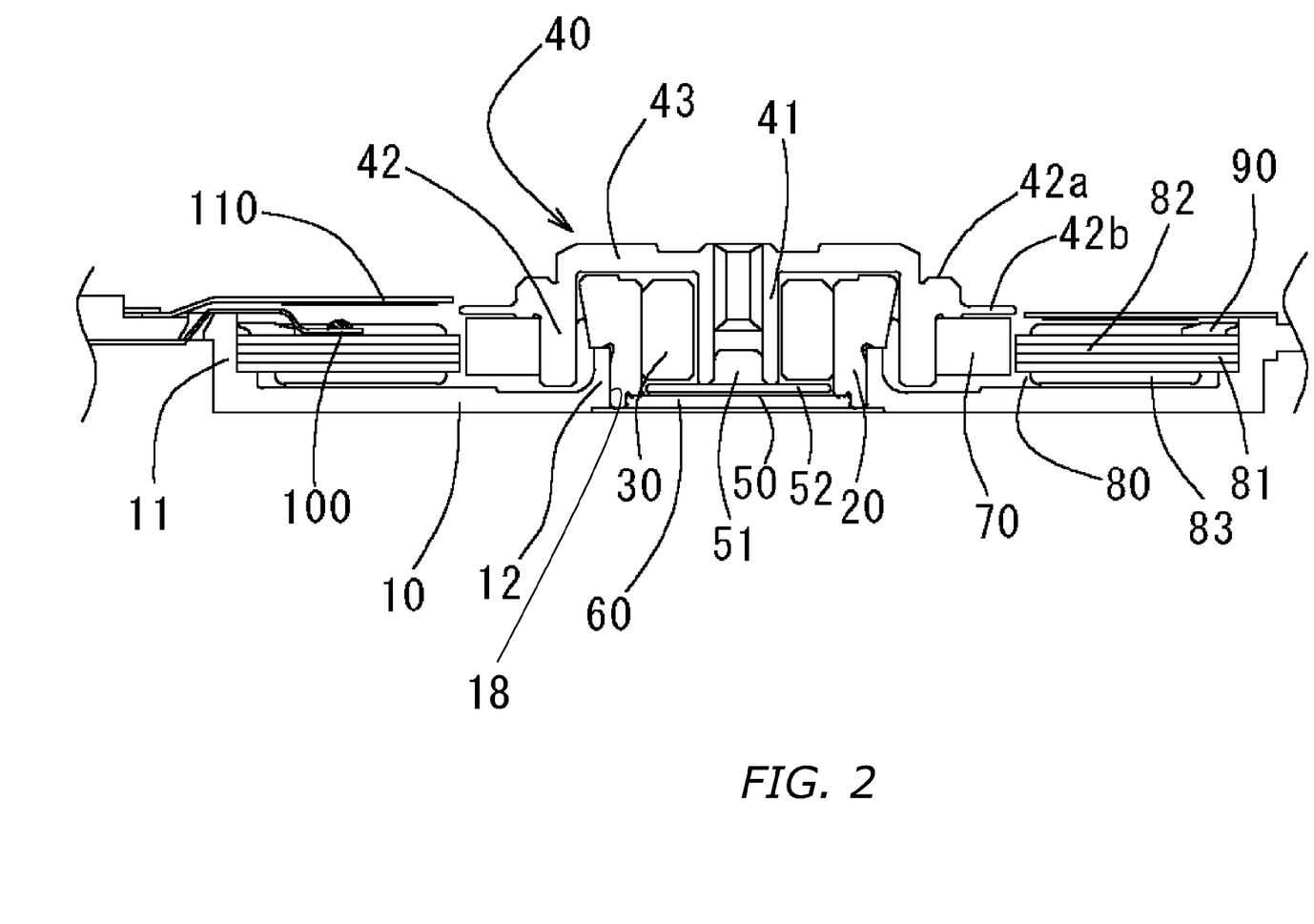
FIG. 2 is a longitudinal sectional view showing a spindle motor according to the first preferred embodiment of the present invention.
Figure 3A:
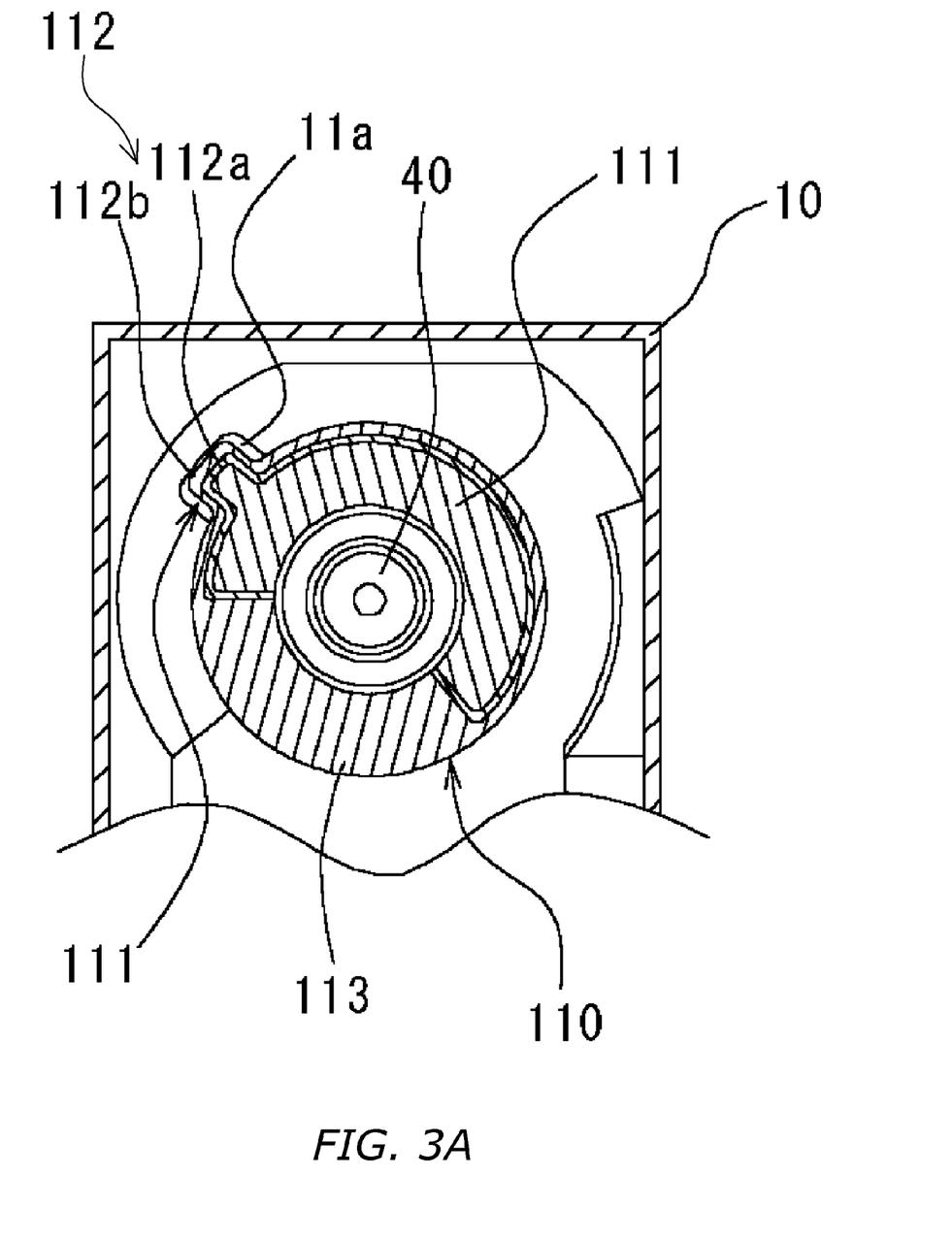
FIG. 3A is a top view showing the spindle motor illustrated in FIG. 2.
Figure 3B:
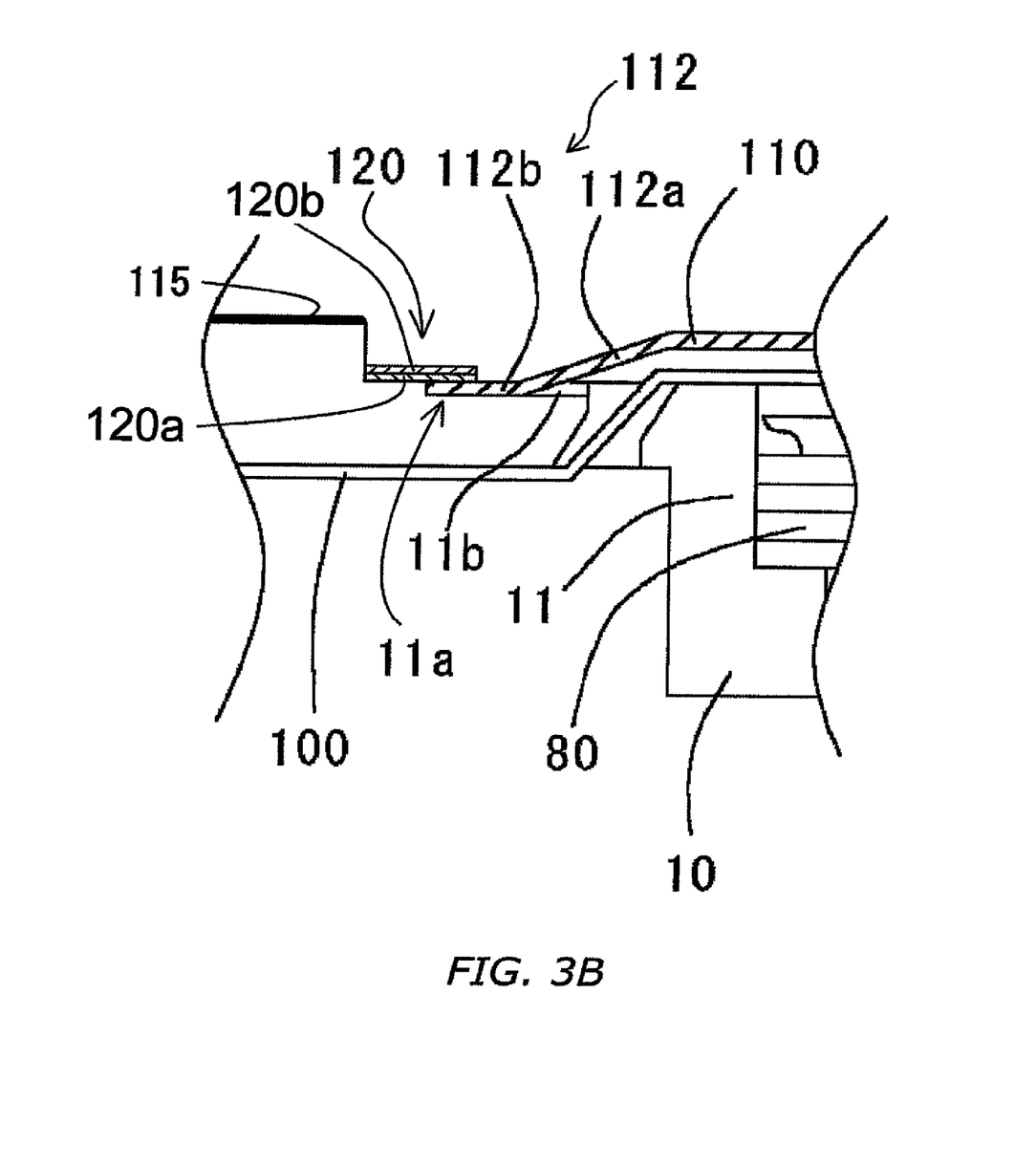
FIG. 3B is an enlarged view showing an essential part of the spindle motor illustrated in FIG. 2.
Figure 4A:
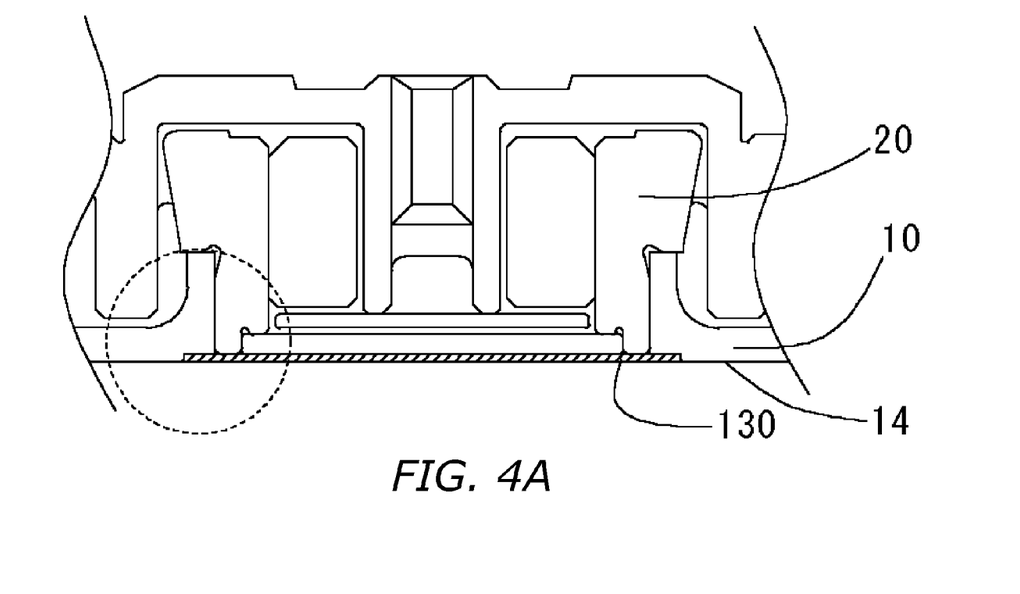
FIG. 4A is an enlarged view showing an essential part of the spindle motor illustrated in FIG. 2.
Figure 4B:
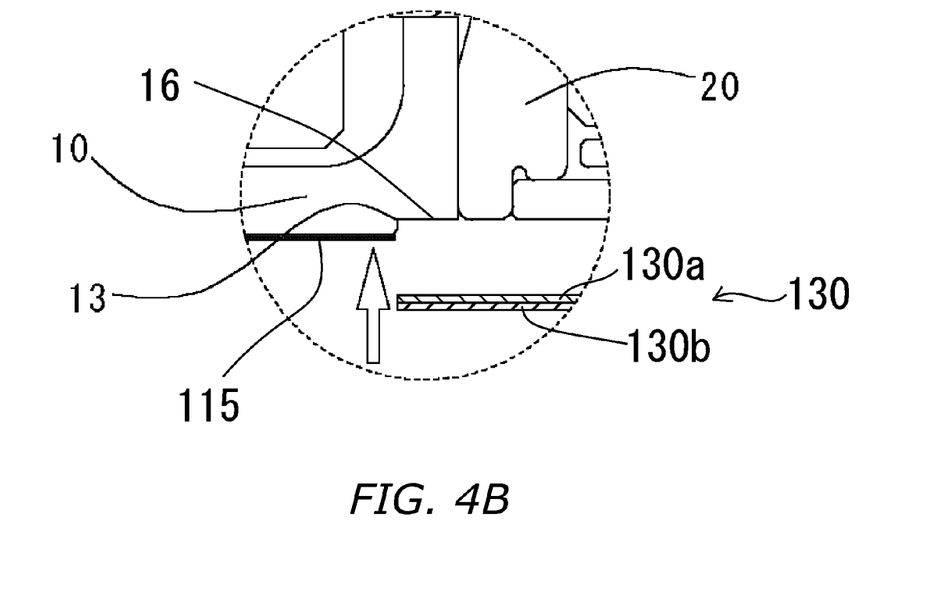
FIG. 4B is an enlarged view showing a part of FIG. 4A circled by a broken line in FIG. 4A.
Figure 5:
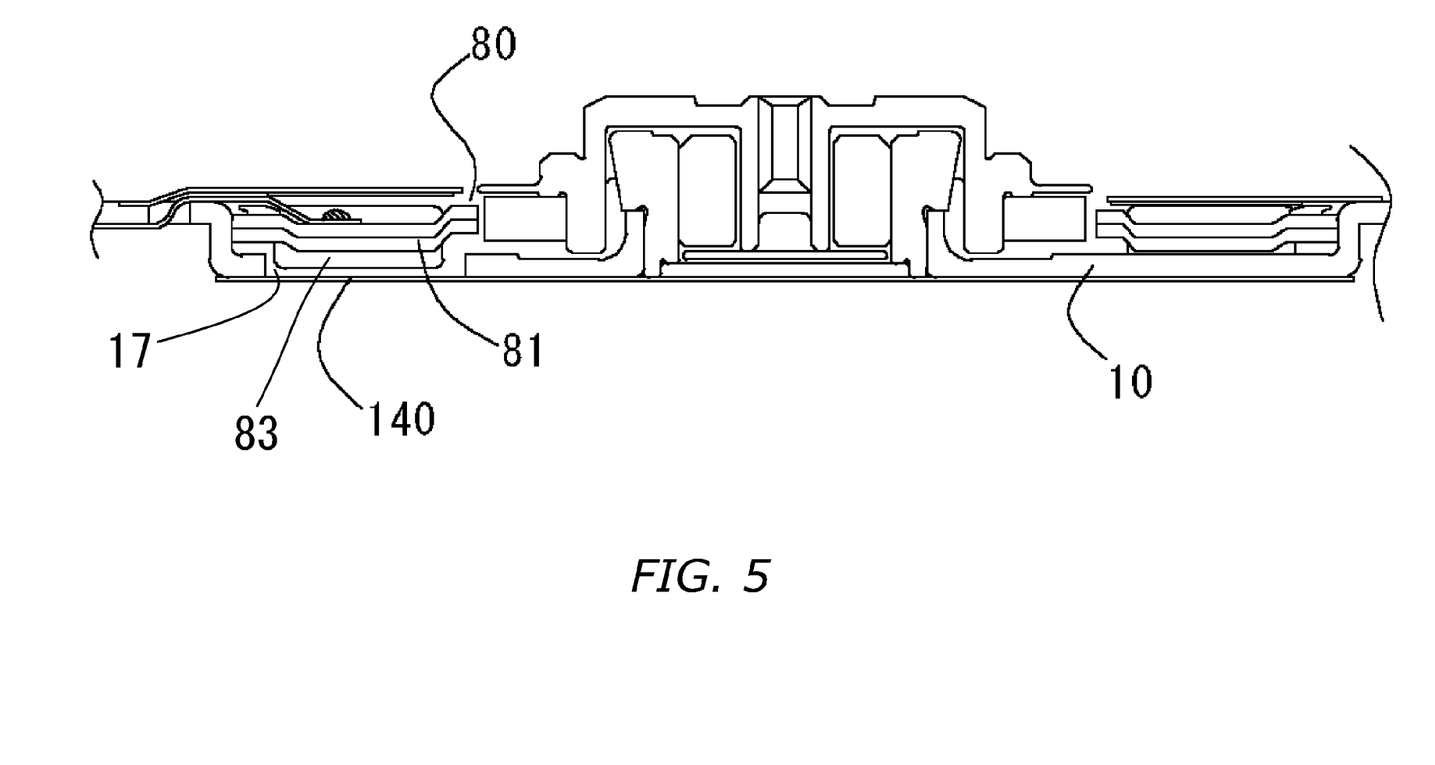
FIG. 5 is a longitudinal sectional view showing a spindle motor according to a second preferred embodiment of the present invention.
Figure 6:
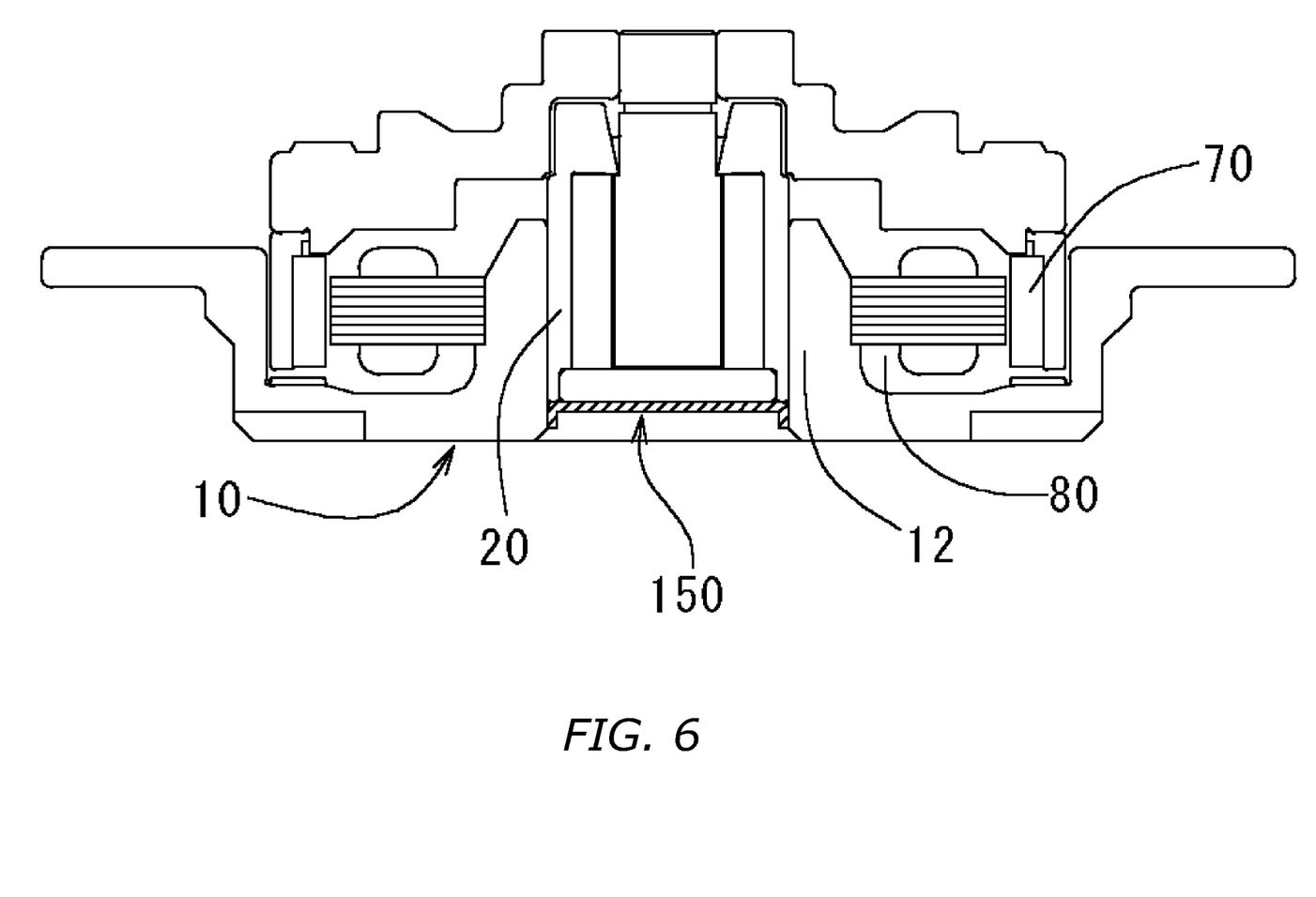
FIG. 6 is a longitudinal sectional view showing a spindle motor according to a third preferred embodiment of the present invention.

FIG. 1 is a longitudinal sectional view showing a hard disk drive (HDD) according to a first preferred embodiment of the present invention. FIG. 2 is a longitudinal sectional view showing a spindle motor according to the first preferred embodiment of the present invention. FIG. 3A is a top view showing the spindle motor illustrated in FIG. 2 without an electroconductive sheet member 120 being attached. FIG. 3B is an enlarged view showing an abutting portion of the spindle motor illustrated in FIG. 2, at which a magnetic shield plate 110 is abutted against a base plate 10. FIG. 4A is an enlarged view showing a fix portion of the spindle motor illustrated in FIG. 2, at which the base plate 10 and a housing 20 are fixed. FIG. 4B is an enlarged view showing a part of FIG. 4A circled by broken line, in which the base plate 10 before attaching the electroconductive sheet member 130 is illustrated. FIG. 5 is a longitudinal sectional view showing another preferred embodiment of the present invention. FIG. 6 is a longitudinal sectional view showing another preferred embodiment of the present invention.

Without specific instructions, such as upper, bottom, upward, and downward directions in the specification correspond to upper, bottom, upward, and downward directions in the FIGS. It should be understood that these directions do not indicate an actual positional relationship.

First Embodiment

As shown in FIG. 1, a recording-disk-driving device 1 includes a housing 2 having a substantially rectangular shape. The inside space of the housing 2 is provided as an extremely clean space with only few dust particles therein. The housing 2 includes a circular concave portion 2a, and a spindle motor 4 equipped with a hard disk 3 storing information is arranged within the circular concave portion 2a of the housing 2. The housing 2 and a base plate 10, which will be described later in detail, may be formed either into a unitary member or into separate pieces of members.

In addition, a head mechanism 5 which reads/writes information from/to the hard disk 3 is installed within the housing 2. The head mechanism 5 includes a magnetic head 5a reading/writing information stored on the hard disk 3, an arm 5b supporting the magnetic head 5a, and an actuator 5c displacing the magnetic head 5a and the arm 5b into the specific location over the hard disk 3.

By using the spindle motor 4 described above, the recording-disk-driving device 1 may be downsized in its dimension and its height while maintaining the sufficient functions. As a result, a downsized, highly reliable, and durable recording-disk-driving device is realized.

With referring to FIGS. 2, 3A, 3B, 4A, and 4B, a base plate 10 is described in detail. The base plate 10 is a base portion of the housing 2 and is an aluminum casting precisely formed by aluminum-pressure die-casting, in which melted metal is injected into a die. A surface of the base plate 10 is smoothly formed. A coating 115 shown in FIGS. 3B and 4B is formed on the base plate 10 by electrodeposition so as to cover the essential part of the base plate 10. With the coating 115 covering the base plate 10, impurities are not dispersed from the surface of the base plate 10 formed by aluminum. Moreover, nonconductivity and corrosion resistance are improved with the coating 115. The coating 115 may be formed by such as the plating processing.

A concave portion 11 is formed on the base plate 10. The concave portion 11 has a substantially circular shape and caves into a downward direction. A base through hole 18 is provided at a middle portion of the concave portion 11, and a cylinder portion 12 extending into an upward direction is formed around the base through hole. A fluid dynamic bearing mechanism is arranged in the base through hole 18. A sleeve housing 20 having a substantially cylinder shape is fixed to an inner side of the cylinder portion 12. A sleeve bearing formed by such as sintering porous materials is fixed to an inner side of the sleeve housing 20. The sleeve bearing 30 is impregnated with lubricant oil.

A rotor hub 40 includes a shaft 41, a cylinder portion 42, and an upper cap portion 42 connecting the shaft 41 and the cylinder portion 42. The shaft 41 is inserted into the sleeve bearing 30 with a radial gap maintained therebetween and is rotatably supported by the sleeve bearing 30. The shaft 41 includes a through hole, and a bottom cap 50 is attached to a bottom end surface of the shaft 41. The bottom cap 50 includes a disk portion 51 and a center protrude portion 52 which engages with the through hole of the shaft 41. The disk portion 51 has a slightly smaller diameter than the sleeve housing 30 and faces a bottom end surface of the sleeve bearing 30 with an axial gap maintained therebetween. A bottom end portion of the sleeve housing 20 is occluded with a plate 60 axially facing the bottom cap 50 with an axial gap maintained therebetween.

A placing portion 42a to which a recording disk (not shown in figures) is placed is formed at a portion of an outer side of the cylinder portion 42 so as to extend into a radially outward direction. At a bottom side of the placing portion 42a, an annular portion 42b is formed so as to extend into a radially outward direction. A rotor magnet 70 is attached to the cylinder portion so that the annular portion 42 is abutted against a portion of the cylinder portion 42 below the annular portion 42. The rotor magnet 70 includes a plurality of magnetic poles which are circularly arrayed. The rotor hub 40 and the rotor magnet 70 rotate. A bottom surface of the upper cap portion 43 faces an upper surface of the sleeve housing 20 with an axial gap maintained therebetween.

Gaps between the shaft 41 and the sleeve bearing 30, between the sleeve bearing 30 and the disk portion 51 of the bottom cap 50, and between the sleeve housing 20 and the upper cap 43 are continuously filled with lubricant oil. Each of the gaps is constituted by the surfaces facing each other, and at least one of the surfaces includes a row of dynamic pressure generating grooves. Therefore, dynamic pressure is generated at each gap, and the rotor is axially and radially supported.

A stator 80 is fixed to an inner side of the concave portion 11 of the base plate 10. The stator 80 includes a plurality of teeth 81 radially inwardly extending, and a coreback portion 82 integrally formed with teeth 81 and connects each of the teeth 81. A coil 83 is wound around the teeth 81. An inner surface of the teeth 81 and the outer surface of the rotor magnet radially face each other.

A flexible printed circuit board 100 (hereinafter referred to as FPC 100) having a circular arc shape is arranged on an upper side of the stator 80 and is fixed to the base plate 10 by such as adhesive.

In addition, a magnetic shield 110 is arranged on an upper side of the FPC 100 and is fixed to the base plate 10. The magnetic shield 110 is made of a conductive and magnetic material so that it prevents the magnetic flux leaked from the radial gap between the rotor magnet 70 and the stator 80 from influencing the magnetic head (5a in FIG. 1).

Upon supplying electricity from an external power supply to the stator 80 via FPC 100, the stator 80 generates magnetic field. The magnetic field interacts with the rotor magnet 70 and generated torque.

With referring to FIGS. 3A to 4B, the preferred embodiment of the present invention is illustrated in detail.

As shown in FIG. 3A, the magnetic shield has an annular shape and covers the stator 80 from an upside thereof. An outer peripheral portion of the magnetic shield 110 is fixed to the base plate 10, and an inner peripheral portion faces the rotor hub 40 with a radial gap maintained therebetween. The magnetic shield 110 is formed so as to include a sponson portion 111, arranged at an axially upper position than the outer peripheral portion of the magnetic shield 110. The sponson portion 111 includes an extending portion 112 extending into radially outward direction. In addition, a head-passing portion 113 over which the magnetic head (5a in FIG. 1) passes is formed at a portion of the magnetic shield 110, other than the sponson portion 111. Moreover, a radially extending surface 11a which radially outwardly extends from the concave portion 11 so as to house the extending portion 112 is formed on the base plate 10.

The electroconductive sheet member 120 is attached to the base plate 10 so as to cover at least portions of the radially extending surface 11a and the extending portion 112. At a portion of the radially extending surface 11a, formed on the base plate 10, to which the electroconductive layer 120a is abutted, the coating 115 is scraped so that the metal material forming base plate 10 is exposed (the portion is referred to as a metal exposed portion). The metal exposed portion may be formed by scraping not only the coating 115, but also a metallic portion of the base plate 10.

The electroconductive sheet member 120 includes an electroconductive layer 120a, which is attached to at least a portion of the base plate 10 and a portion of the magnetic shield 110. The electroconductive layer is a sticky layer which includes an electroconductive material. The electroconductive sheet member 120 also includes a substrate 120b attached to the electroconductive layer 120a. The substrate 120b may be made of any suitable material, such as polyethylene terephthalate (PET), polybutyrene terephthalate (PBT), polyimide (PI), polyethylene (PE), and polyp pyrene (PP). The electroconductive sheet member 120 may includes more than three layers. The electroconductive sheet member may be formed into any suitable shape, such as rectangle, circular arc, circle and so on.

In this preferred embodiment of the present invention, the magnetic shield 110 and the base plate 10 may be preferably conducted each other by the electroconductive sheet member 120. Conventionally, it is necessary to put the spindle motor assembled with the electroconductive adhesive in the thermostatic chamber for at least one hour to harden the adhesive. However, according to the preferred embodiment of the present invention, the conductivity between the magnetic shield 110 and the base plate 10 is attained by solely attaching the electroconductive sheet member 120. Therefore, it is not necessary to make an investment on equipments such as thermostatic chambers, and the manufacturing time of the spindle motor is shortened. Therefore, the cost reduction of manufacturing spindle motor may be achieved.

According to this preferred embodiment of the present invention, the metal exposed portion is formed on the base plate 10, such that the conductivity between the base plate 10 and the electroconductive sheet member 120 may be preferably achieved. In addition, adhesion of the electroconductive layer 112a to the metal layer is improved by abutting it to the metal exposed portion, compared with abutting it to the coating.

Upon the processing the metal exposed portion, the working tool is adjusted so that the average surface roughness (Ra) of the radially extending surface 11a is to be in the range of about 0.2 μm to about 1.5 μm. With the surface roughness in that range, the adhesion of the electroconductive layer 112a to the base plate 10 is further improved. Therefore, the electroconductive sheet member 120 may be further firmly attached to the base plate 10.

As shown in FIG. 3, an inclined surface 112a which downwardly inclines toward radially outward direction and an abutting surface 112b which abuts against the radially extending surface 11a of the base plate 10 are formed at the outer peripheral portion of the extending portion 112 provided on the magnetic shield 110.

The radially extending surface 11a of the base plate 10 abutted against the abutting portion 112b includes a concave portion 11b, axial depth of the concave portion is substantially the same as the thickness of the magnetic shield 110. By virtue of the configuration mentioned above, an upper surface of the abutting surface 112b of the magnetic shield 110 and an upper surface of the radially extending surface 11a are on a substantially same plane. Therefore, it is possible to attach the electroconductive sheet member 120 without applying unnecessarily strong force.

Moreover, the concave portion 11b facilitates the positioning of the magnetic shield 110. The concave portion 11b prevents the magnetic shield 120 from being misaligned into the radial and/or circumferential direction. Therefore, the electroconductive sheet member 120 is firmly and precisely attached to the base plate 10. As a result, a highly reliable spindle motor is realized.

With referring to the FIG. 4A, the conductivity between the base plate 10 and the sleeve housing 20 is attained as below. A bare metal surface 16 which is formed by scraping the coating 115 and a portion of the base plate 10 so that the metal material is exposed is formed at the bottom surface of the base plate 10. An electroconductive sheet member 130 is abutted and attached to the bottom surface of the sleeve housing 20 and the bare metal surface 16.

The electroconductive sheet member 130 includes an electroconductive layer 130a which is abutted against the bottom surface of the sleeve housing 20 and the bare metal surface 16, and a substrate 130b which is attached to the electroconductive layer 130b. The electroconductive layer is a sticky layer which includes an electroconductive material. The substrate 120b may be made of any suitable material, such as polyethylene terephthalate (PET), polybutyrene terephthalate (PBT), polyimide (PI), polyethylene (PE), and polyp pyrene (PP). Characters and/or codes representing information such as product names and serial numbers may be printed on one side of the substrate 130, other side of which is attached to electroconductive layer 130a, (i.e., the information is printed on a bottom surface of the substrate 130 in FIG. 4). In other words, the substrate 130 may be used as a name plate. Therefore, number of components for the spindle motor is reduced, which results in reducing the manufacturing cost of the spindle motor further. The electroconductive sheet member 120 may includes more than three layers. The electroconductive sheet member may be formed into any suitable shape, such as rectangle, circular arc, circle and so on.

The sleeve housing 20 is fixed to the base plate 10 by such as an anaerobic adhesive. The electroconductive adhesive is not as strong as the anaerobic adhesive in terms of the binding power, and is not suitable for binding members with great strength or for binding members to which the load is applied. Therefore, the electroconductive adhesive is applied to conduct the base plate 10 and the sleeve housing 20 after binding them. However, it is necessary to put such spindle motors in the thermostatic chamber for predetermined time to harden the electroconductive adhesive. It requires additional processing time and investments on equipments.

In this preferred embodiment according to the present invention, the conductivity between the base plate 20 and the sleeve housing 20 is preferably maintained by the electroconductive sheet member 130 in a simple manner. Therefore, static electricity generated around the recording disk during the rotation thereof is dissipated to the base plate 10 through the rotor, sleeve 30, and the sleeve housing 20.

As shown in FIG. 4B, a concave portion 13 may be formed around the bare metal surface 16 of the base plate 10. The concave portion 13 is formed along the shape of the electroconductive sheet member 130, and the electroconductive sheet member 130 is fitted within the concave portion 13. Therefore, the electroconductive sheet member 130 is easily positioned and firmly fixed.

The axial depth of the concave portion 13 is larger than the axial thickness of the electroconductive sheet member 130; therefore, the bottom surface of the electroconductive sheet member 130 does not protrude from the bottom surface 14 of the base plate 10. In case that the bottom surface 14 of the base plate 10 is a datum surface while attaching it to the housing of HDD or to the electronic device, the electroconductive sheet member 130 is not abutted against the housing of the HDD or the electronic devices by virtue of the configuration mentioned above. Therefore, it is possible to prevent the read/write error from being occurred, the error caused by contacting the magnetic head (5a in FIG. 1) and the recording disk (4 in FIG. 1) when the motor is inclined. Moreover, the interferences of the HDD and other components of electronic devices are prevented as well, and an excellent arrangement of the components may be achieved.

When the bare metal surface 16 and the bottom surface of the sleeve housing 20 is formed so as to be on a substantially same plane, the electroconductive sheet member 130 may be attached firmly without applying unnecessary force on it. Moreover, by virtue of the configuration, the air existing between the electroconductive sheet member 130, and the bare metal surface 16 and the bottom surface of the sleeve housing 20 is minimized; therefore, the electroconductive sheet member 130 may be more firmly stick to the bare metal surface 16 and the sleeve housing 20.

By forming the bare metal surface 16 with the surface roughness (Ra) in the range of about 0.2 μm to about 1.5 μm, it is possible to attach the electroconductive sheet member 130 more firmly to the bare metal surface 16.

The electroconductive sheet member 130 may be attached to the base plate 10 after heading the base plate 10 and/or the electroconductive sheet member 130 at about 40 to 50° C. By heating the electroconductive sheet member 130, the electroconductive layer 130a is heated as well, and flowability of the material constituting the electroconductive layer 130a increases. As a result, the material constituting the electroconductive layer penetrates into the minute concaves, and the adhesion of the electroconductive sheet member 130 is further improved. In addition, the work efficiency may be improved because workers can handle the base plate 10 in about 40 to 50° C. with their hand.

By forming the base plate 10 and the sleeve housing 20 with substantially same materials or with different materials but having substantially same thermal expansion coefficient, the thermal deformation caused by the thermal expansion may be prevented or minimized under the high temperature circumstance. Therefore, the stress applied to the electroconductive sheet member 130 may be reduced. As a result, it is possible to prevent the peeling defect of the electroconductive sheet member 130 and to provide a highly reliable spindle motor.

Second Embodiment

As shown in FIG. 5, a coil recessing hole 17 into which a portion of the coil 83 wound around each of the teeth 81 is arranged is formed at a portion of the base plate 10 facing each of the teeth 81 of the stator 80 respectively. By virtue of the configuration, thin spindle motors may be provided.

The stator 80 generates considerable electromagnetic waves which may leak from the HDD having the spindle motor. Such electromagnetic waves may influence the electronic devices having the HDD. In this preferred embodiment of the present invention, an electroconductive sheet member 140 including at least an electroconductive layer and an aluminum layer is attached to the base plate 10 so as to fully cover the bottom surface of the base plate 10. As a result, the sleeve housing 20 is conducted to the base plate 10 while occluding the base through hole 17. In addition, the electromagnetic wave generated by the stator 80 may be prevented from leaking outside of the HDD.

The electroconductive sheet member 140 may further include a substrate on one side of the aluminum layer (i.e., a bottom side in FIG. 5), other side of which is abutted against the electroconductive layer. The substrate 120b may be made of any suitable material, such as polyethylene terephthalate (PET), polybutyrene terephthalate (PBT), polyimide (PI), polyethylene (PE), and polyp pyrene (PP).

Third Embodiment

FIG. 6 shows an outer rotor motor with the electrocunductive sheet member according to the third preferred embodiment of the present invention, in which a rotor magnet 70 is arranged in a radially outside position from the stator 80.

A electroconductive sheet member 150 is preferably applied to a spindle motor in which a bottom surface of the cylinder portion 12 of the base plate 10 and a bottom surface of the sleeve housing 20 are arranged in axially different positions, for example as shown in FIG. 6, a bottom surface of the sleeve housing 20 being arranged in an axially upper position than that of the bottom surface of the cylinder portion 12 of the base plate 10. In this preferred embodiment of the present invention, flexible materials may be used for the electroconductive sheet member 150. Such electroconductive sheet member 150 may be bended; therefore, the electroconductive sheet member may be attached to the bottom surface of the sleeve housing 20 and the inner side of the cylinder portion 12 of the base plate 10.

Conventionally, it is necessary to provide an adhesive sump at an engaging portion of the sleeve housing 20 and the cylinder portion 12 of the base plate 10. With the electroconductive sheet member 150, however, the process to form the adhesive sump may be omitted. Therefore, the shapes of the base plate 10 and the sleeve housing 20 may be simplified, and the cost for these components may be reduced. The portion of the base plate 10 to which the electroconductive sheet member is attached may be a metal exposed portion, at which the metallic material constituting the base plate 10 is exposed.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

For example, the sleeve and the sleeve housing may be integrally formed into a unitary member, and the unitary member may support the shaft. In this configuration, the electroconductive sheet member is attached so as to cover at least portions of the base plate and the unitary member.

For example, a spindle motor may utilize any suitable bearing mechanism, such as a hydro dynamic bearing, a gas dynamic bearing, and a ball bearing.

The preferred embodiments of the present invention may be preferably applied to a shaft-fixed spindle motor, in which the shaft is fixed to the base plate and the sleeve is rotatably supported.

What is claimed is:

1. A motor unit including a spindle motor to drive a recording disk, comprising:
   a base portion having a through hole along a center axis and being a portion of a housing defining a sealed inside space;
   a fluid dynamic bearing mechanism arranged in the through hole; a rotor supported by the fluid dynamic bearing mechanism; and an electroconductive sheet member including at least an electroconductive layer and a substrate;

wherein the electroconductive layer electrically connects the base portion and the fluid dynamic bearing mechanism by abutting thereto, and the substrate is attached to one side of the electroconductive layer, and another side of the electroconductive layer abuts the base portion and the fluid dynamic bearing mechanism; and wherein the base portion includes a concave portion, the surface of the base portion concaves into an axially upward direction, and the electroconductive sheet member is placed within the concave portion.

2. The motor unit as set forth in claim 1, wherein:

a coating is provided so as to cover an outer surface of the base portion formed by metallic material;

a mental exposed surface at whicj the metallic material forming the base portion is exposed is provided; and the metal exposed surface is provided within the concave portion.

3. The motor unit as set forth in claim 1, wherein an axial depth of the concave portion is longer than an axial thickness of the electroconductive sheet member.

4. The motor unit as set forth in claim 1, wherein the base portion is made of aluminum.

5. The motor unit as set forth in claim 1, wherein the electroconductive layer is a sticky layer including an electroconductive material.

6. The motor unit as set forth in claim 1, wherein the electroconductive sheet member further includes an aluminum material layer.

7. A recording-disk-driving device including a recording disk to store information, comprising:

the motor as set forth in claim 1, used to rotate the recording disk;

a head mechanism reading/writing infonnation from/to an specific position of the recording disk; and a device housing cooperating with the base portion to define a sealed inside space which houses the recording disk, the motor of the motor unit, and the head mechanism.

8. A motor unit includin a spindle motor to drive a recording disk, comprising;

a base portion having a through hole along a center axis and being a portion of a housing defining a sealed inside spage;

a fluid dynamic bearing mechanism arranged in the through hole; a rotor supported by the fluid dynamic bearing mechanism: and an electroconductive sheet member including at least an electroconductive layer and a substrate;

wherein the electroconductive layer electrically connects the base portion and the fluid dynamic bearing mechanism by abutting thereto, and the substrate is attached to one side of the electroconductive layer, and another side of the electroconductive layer abuts the base portion and the fluid dynamic bearing mechanism:

wherein a coating is provided so as to cover an outer surface of the base portion formed by a metallic material;

wherein a metal exposed surface at which the metallic material forming the base portion is exposed is provided; and wherein the electroconductive sheet member is attached to the metal exposed surface.

9. The motor unit as set forth in claim 8, wherein the metal exposed surface is formed by scraping the coating covering the outer surface of the base portion with a part of the base portion formed by the metallic material.

10. The motor unit as set forth in claim 8, wherein an average surface roughness of the metal exposed surface is less than about 1.5 μm.

11. A motor unit including a spindle motor for driving a recording disk supported at an outer peripheral portion of the spindle motor, comprising:

a base portion having a through hole along a center axis and being a portion of a housing defining a sealing inside space;

a fluid dynamic bearing mechanism arranged in the through hole;

a rotor which is supported by the fluid dynamic bearing portion and includes a rotor magnet having magnetic poles circularly arrayed and a placing portion to an outer peripheral portion of which the recording disk is placed;

a stator facing the rotor magnet with a radial gap maintained therebetween, the stator includes a plurality of teeth radially arranged with tip ends thereof being directed to the center axis, and a coreback connecting a plurality of the teeth, a coil wound around each of a plurality of the teeth; a magnetic shield made of a soft magnetic material and arranged between the placing portion and the coil in the axial direction; and an electroconductive sheet member including at Least an electroconductive layer electrically connecting the base portion and the magnetic shield by abutting thereto, and a substrate attached to one side of the electroconductive layer, and another side of the electroconductive layer abuts the base portion and the magnetic shield.

12. The motor unit as set forth in claim 11, wherein:

a coating is provided so as to cover an outer surface of the base portion;

a metal exposed surface at which a metallic material forming the base portion is exposed is provided; and the electroconductive sheet member is attached to the metal exposed surface.

13. The motor unit as set forth in claim 12, wherein the metal exposed surface is formed by scraping the coating covering the outer surface of the base portion with a part of the base portion formed by the metallic material.

14. The motor unit as set forth in claim 12, wherein an average surface roughness of the metal exposed surface is less than about 1.5 μm.

15. The motor unit as set forth in claim 11, the base portion includes a concave portion, the surface of the base portion concaves into an axially downward direction, and the electroconductive sheet member is placed within the concave portion.

16. The motor unit as set forth in claim 15, wherein an axial depth into the axially upward direction of the concave portion is substantially the same to an axial thickness of the electroconductive sheet member.

17. The motor unit as set forth in claim 11, wherein the base portion is made of aluminum.

18. The motor unit as set forth in claim 11, wherein the electroconductive layer is a sticky layer including an electroconductive adhesive.

19. A recording-disk-driving device including a recording disk to store information, comprising:

the motor as set forth in claim 11, used to rotate the recording disk;

a head mechanism reading/writing information from/to an specific position of the recording disk; and a device housing cooperating with the base portion to defined a sealed inside space housing the recording disk, the motor of the motor unit, and the head mechanism.

* * * * *